United States Patent [19]

Friesenhahn

[11] 4,447,727
[45] May 8, 1984

[54] LARGE AREA NEUTRON PROPORTIONAL COUNTER AND PORTAL MONITOR DETECTOR

[75] Inventor: Stanley J. Friesenhahn, Poway, Calif.

[73] Assignee: IRT Corporation, San Diego, Calif.

[21] Appl. No.: 278,958

[22] Filed: Jun. 30, 1981

[51] Int. Cl.³ .............................. G01T 1/18; G01T 3/00
[52] U.S. Cl. .................................... 250/390; 250/374; 250/385
[58] Field of Search ............... 250/374, 382, 385, 390, 250/391, 392; 376/254, 255

[56] References Cited

U.S. PATENT DOCUMENTS

| | | | |
|---|---|---|---|
| 3,760,183 | 9/1973 | Niessel | 250/252 |
| 3,898,466 | 8/1975 | Kawashima | 250/390 |
| 3,984,691 | 10/1976 | Allemand et al. | 250/385 |
| 4,008,399 | 2/1977 | Brown | 250/390 |
| 4,086,490 | 4/1978 | Todt | 250/385 |
| 4,150,290 | 4/1979 | Erskine et al. | 250/283 |
| 4,365,159 | 12/1982 | Young | 250/390 |

OTHER PUBLICATIONS

Young, C. A., *Efficiency of a Multilayer $^6$Li Neutron Detector*, and NOSC/TN 661, 1979, pp. 1–24.
Caldwell, J. T., Atwater, H. F. and Shunk, E. R., *A High Efficiency Passive Neutron Counting System for Very Large Transuranic Waste Packages*, L.S.-U.R. 79-3047, Los Alamos Scientific Laboratory, 1980, pp. 1–2.
Fehlau, P. E., and Eaton, M. J., *Passive Nuclear Material Detection in a Personnel Portal in Period*, IN: National Bureau of Standard Special Publication 582, Measurement Technology for Safeguards and Materials Control, N.B.S., 1980, pp. 365–371.
McDowell, C. T., "Safeguards and Non-proliferation," IN: *Analytical Methods for Safeguards and Accountability Measurements of Special Nuclear Materials*, N.B.S., Special Publication 528, N.B.S., 1978, p. 80.
Harlan, R. A., "Experiences with a Counter for Plutonium in Crates," IN: *Analytical Methods for Safeguards and Accountability Measurements of Special Nuclear Materials*, N.B.S. Special Publication 528, N.B.S., 1978, p. 207.

Primary Examiner—Janice A. Howell
Attorney, Agent, or Firm—Fitch, Even, Tabin & Flannery

[57] ABSTRACT

A large area neutron proportional counter is constructed utilizing a large sealed metal box. The interior walls of the box are coated with $^6$Li enriched metal. A multicelled proportional counter structure within the internal space defined by the box is fabricated using a hydrogenous plastic. The interior of the box is filled with a counting gas. Wires running through the box, and insulated therefrom, are raised to a suitably high potential so that the counting gas functions in the proportional region to amplify and collect charge from ionizing events in the gas, the wires acting as a anodes and the box as cathode. The cell dimensions are chosen so that $^6$Li(n,α)$^3$H reaction products will, with high probability, stop in the gas. Compton electrons, on the other hand, will mostly be stopped in the walls or in the hydrogenous plastic cell boundaries. An array of such counters may be utilized for detection of neutron emitting materials passing through a portal.

29 Claims, 13 Drawing Figures

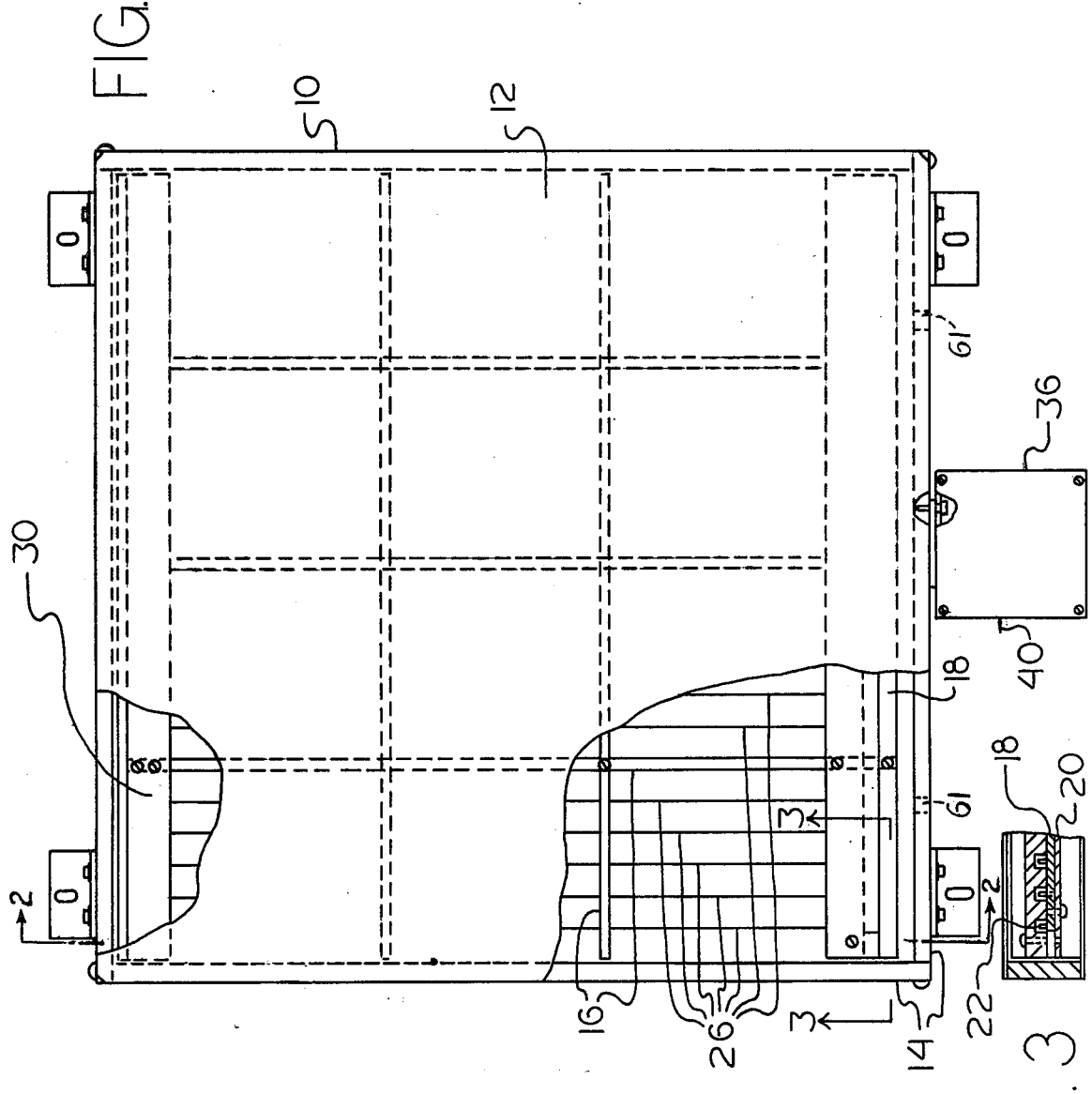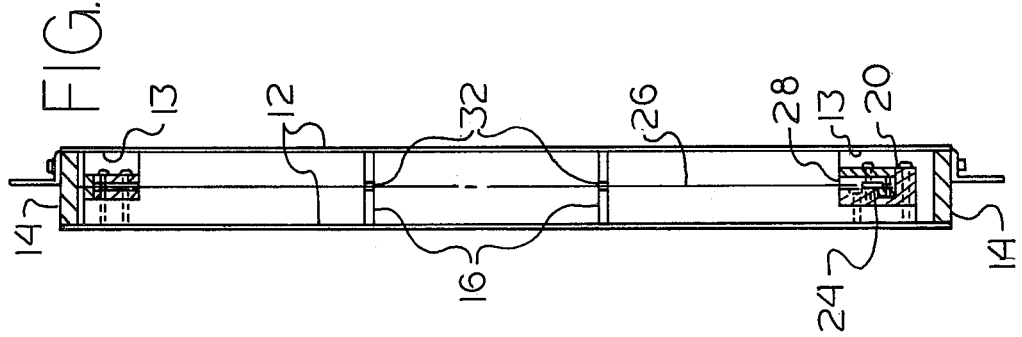

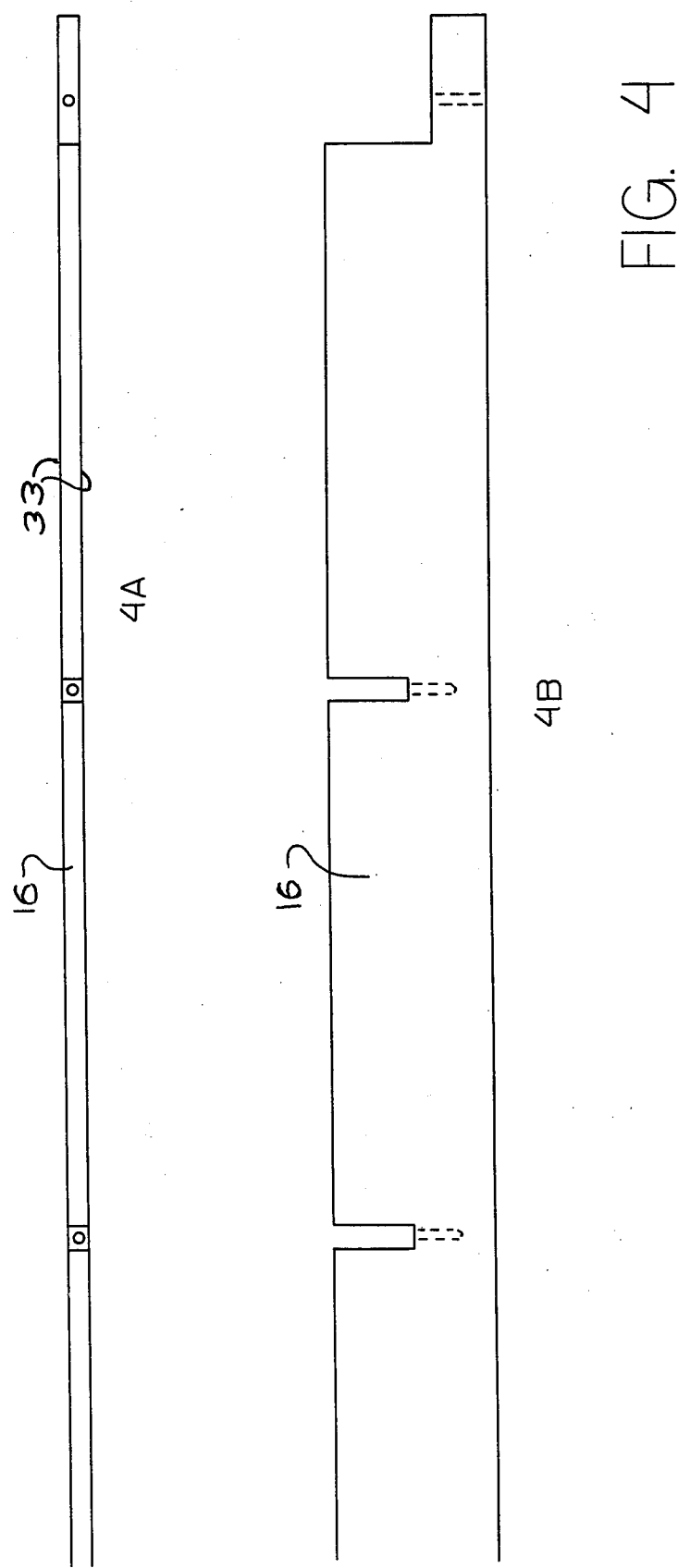

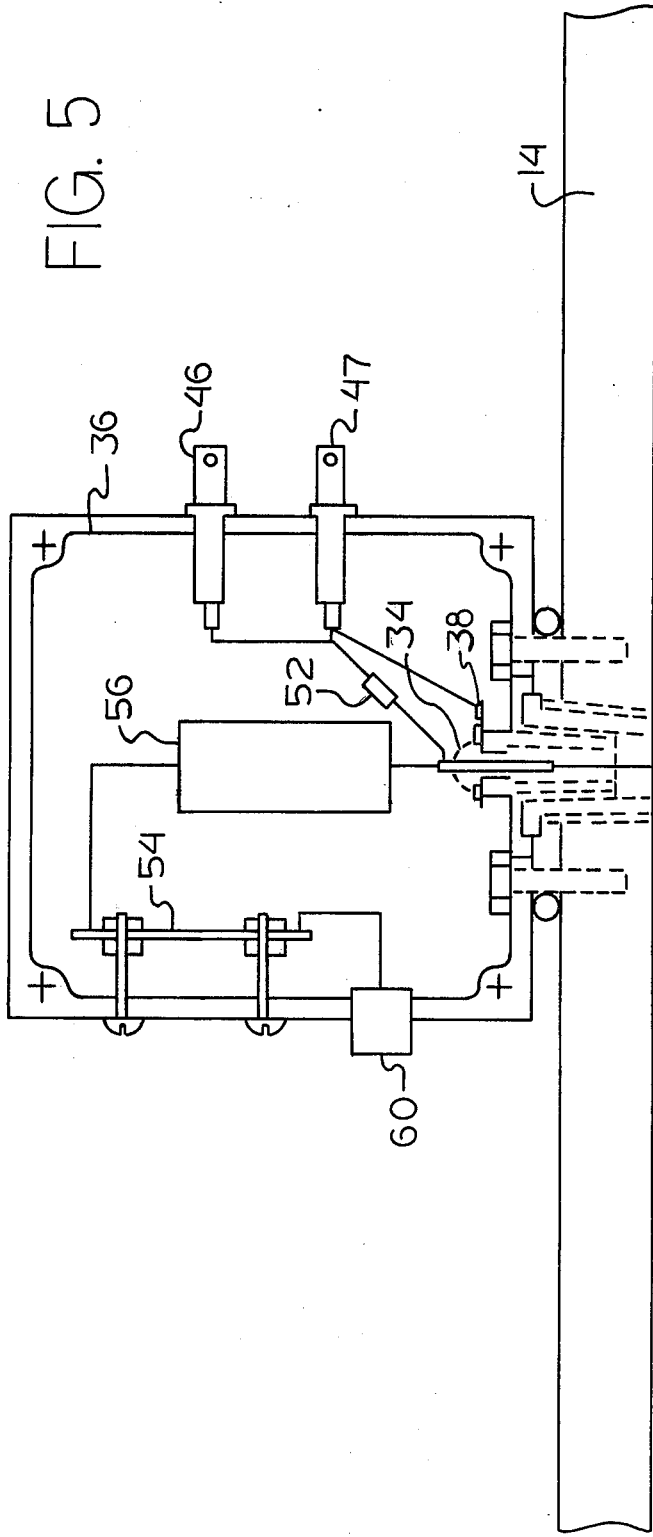

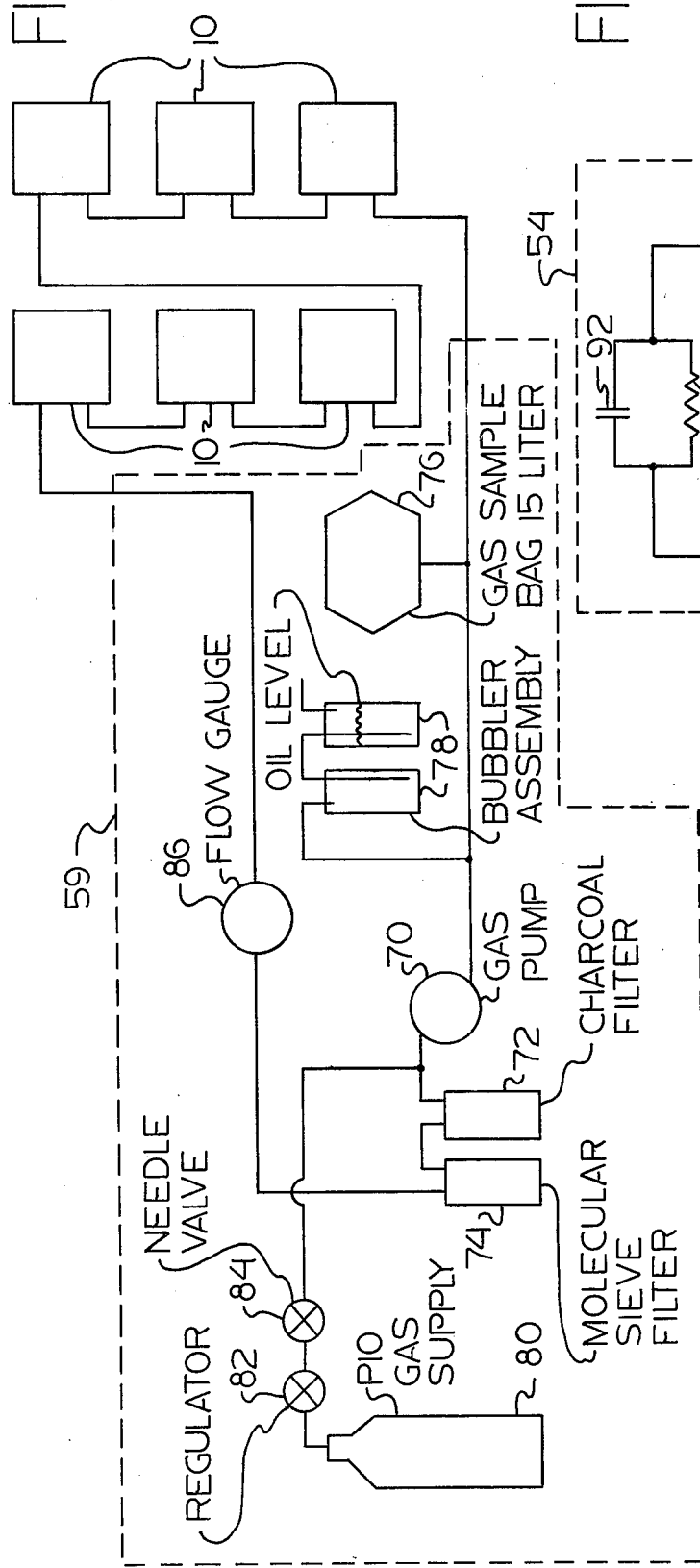
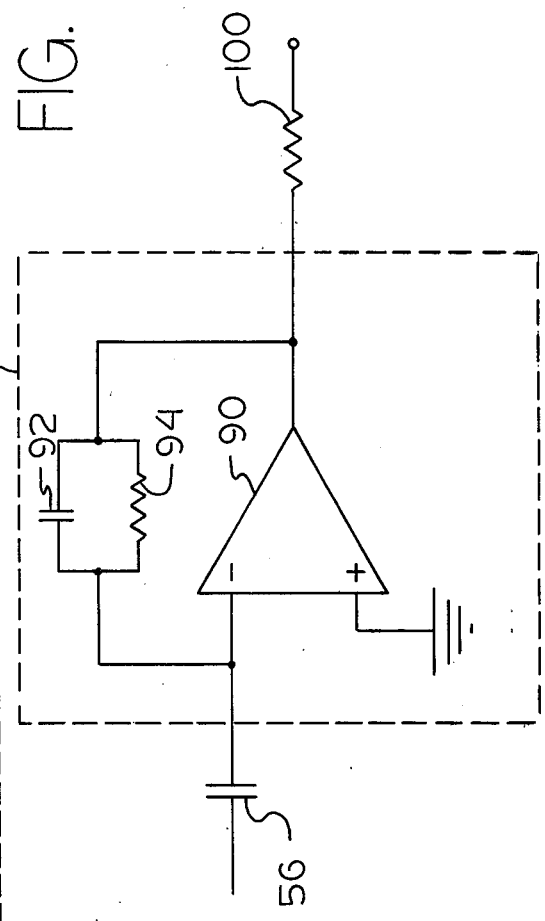

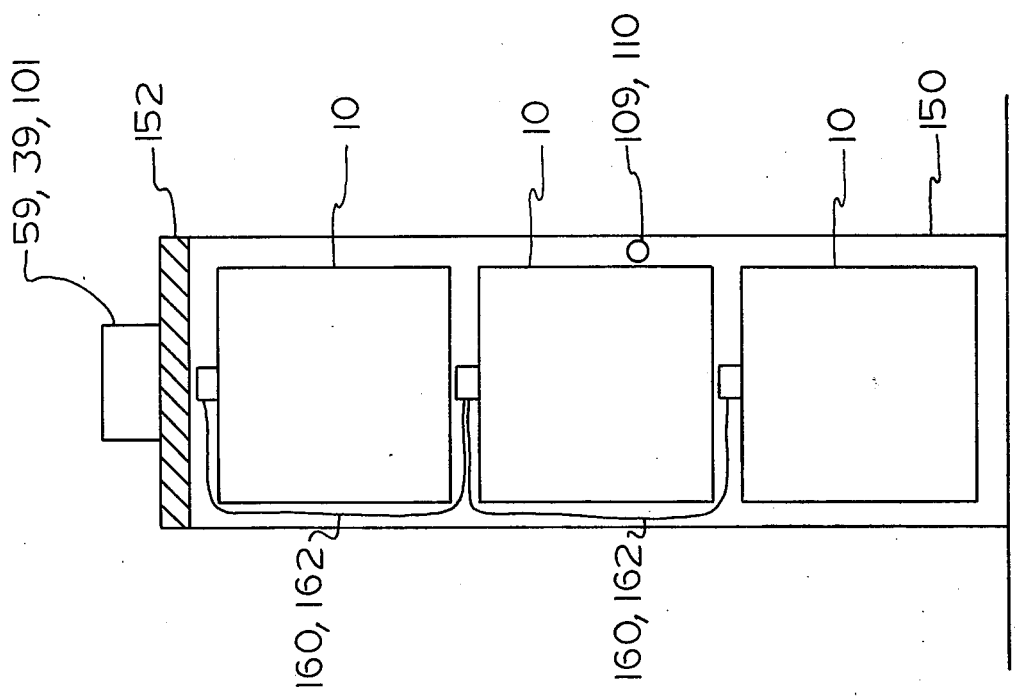
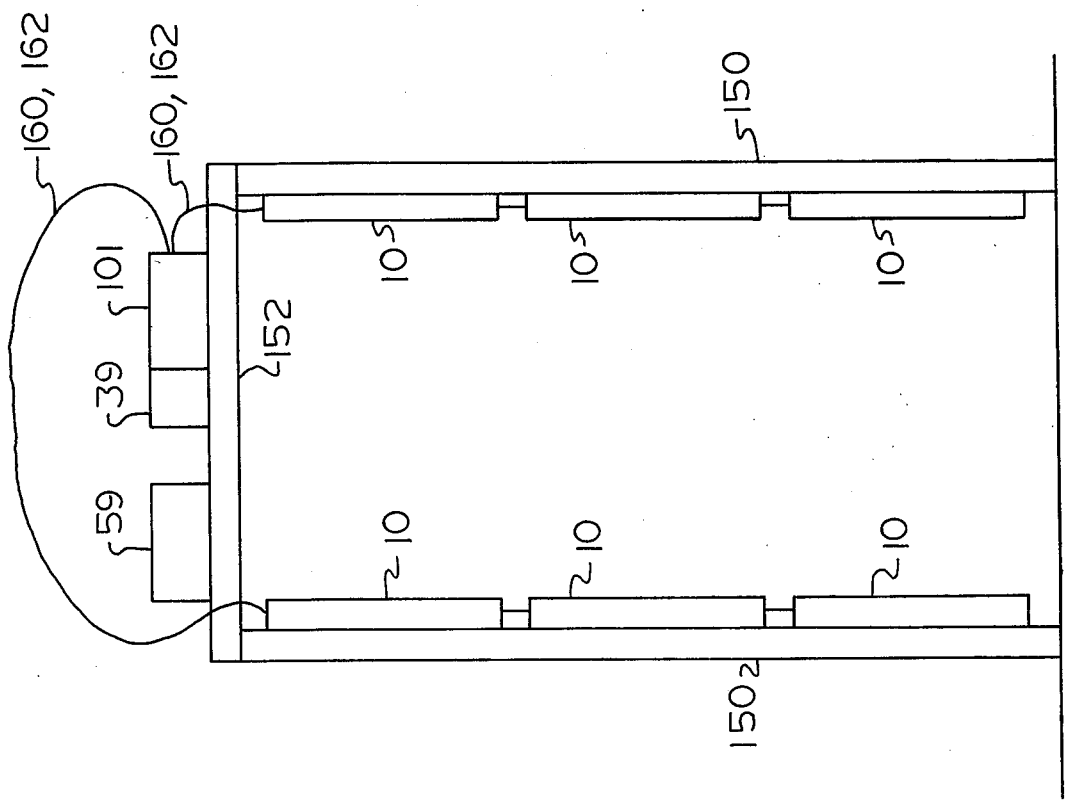

LARGE AREA NEUTRON PROPORTIONAL COUNTER AND PORTAL MONITOR DETECTOR

This invention relates to a neutron detector and more particularly to such devices having a large area suitable for the detection of very weak neutron sources, especially for portal monitors used in the control of nuclear materials.

BACKGROUND OF THE INVENTION

The impending emergence of the plutonium recycle nuclear fuel economy as an important element in the world energy supply has made the solution of nuclear materials control problems very important. Many thousands of persons will have daily access to plutonium (Pu) material which could be used for terrorist activities and, as a consequence, the diversion of such material is a major risk factor to be confronted by the nuclear industry.

Aside from strict inventory control, the most reliable method of preventing the diversion of fissionable materials is the detection of the natural radioactivity of such materials at plant exit points. Even inventory control requires the detection of plutonium in the assay of waste material. Techniques involving induced activation, while quite effective, are expensive and pose unacceptable health hazards where personnel inspection is involved.

All fissionable isotopes emit gamma rays which are easily detected, and thus a gamma ray detector provides some measure of control. It does, however, suffer from two major disadvantages:

1. The predominant gamma radiation from the most important fissionable isotopes is low in energy, and hence detection can be prevented by a rather modest amount of shielding.

2. A fuel reprocessing plant will necessarily have to deal with large quantities of nonfissile gamma ray emitting isotopes. Thus the passage of fissionable materials may be effectively masked by the signals arising from other radioactive materials.

Fortunately, the plutonium produced under the high burnup conditions typical in a commercial nuclear power plant contains appreciable quantities of the heavier plutonium isotopes, particularly $^{240}$Pu and $^{242}$Pu, which are appreciable neutron sources via spontaneous fission decay. Most of the uranium isotopes of interest have very small spontaneous fission decay branching ratios, thereby producing a rather low neutron flux unless the material is in the form of a light element compound such as an oxide or fluoride. Such compounds produce neutrons via the $(\alpha,n)$ reaction. As a high neutron flux is largely unique to the material of interest, it provides the most feasible method for detection of diversion by personnel.

Prevention of detection by shielding of the material is not feasible because the emitted neutrons are energetic and hence must be moderated in energy by a large quantity of hydrogenous material before they can be absorbed. Such a large shield would be an obvious indication of diversion.

A neutron detection system, a portal monitor for detecting neutrons emanated by special nuclear materials, has been described by Fehlau and Eaton in their paper published in *Measurement Technology for Safeguards Material Controls* (U.S. National Bureau of Standards Special Publication No. 582, 1980), p. 365, entitled "Passive Nuclear Material Detection in a Personnel Portal." As there described, a booth is coated with polyethylene material. Neutrons born in the booth enter the polyethylene, which moderates and reflects some of the neutrons. Arrays of 12 detectors in the booth then detect the neutrons with about 5 percent efficiency. The detectors themselves are $^3$He proportional counters each having a detection area of about 1.5 ft.$^2$.

Allemand, et. al., in U.S. Pat. No. 3,984,691, teach the arrangement of small neutron counters in an array to cover a large area. Such arrays using conventional counters are expensive. The probable cost of a counter arrangement using $^3$He counters or similar conventional counters is in the vicinity of five to ten thousand dollars.

Cost is a very important consideration in the design of neutron counters for monitoring radioactive materials, as emphasized by the Department of Energy speaker at the 1978 *Conference on Analytical Methods for Safeguards and Accountability Measurements of Special Nuclear Materials* (U.S. National Bureau of Standards Special Publication 528, 1978), p. 80.

Counters more efficient than conventional $^3$He or $^{10}$BF$_3$ counters have been investigated by C. A. Young in Naval Ocean Systems Center Technical Note 661, *Efficiency of a Multi-layer $^6$Li Foil Neutron Detector* (March 1979). $^6$Li permits the efficient detection of neutrons using very thin foils of $^6$Li. When a $^6$Li nucleus absorbs a slow neutron, it undergoes the reaction:

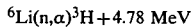

$$^6\text{Li}(n,\alpha)^3\text{H} + 4.78 \text{ MeV}$$

The large amount of energy released as kinetic energy in the reaction products allows at least one of them to escape from relatively thick foils into a surrounding gas volume where an ionization track is produced. The electrons resulting from such ionization may be detected on counting wires in a conventional manner. In Young's apparatus the lithium metal foils are mounted between wire arrays which are stretched on fiberglass-reinforced epoxy-board frames. Young's counters have an area of approximately 0.25 ft.$^2$.

A further disadvantage of neutron detectors used heretofore results from the contamination of the gases used in the gas proportional counters. Absorption of neutrons in the counter results in material being released from the inner surfaces of the counter into the proportional counter gas. The gas is poisoned by the formation of ions in the counter during normal operation, which liberates impurities on the counter walls. Periods of guaranteed operation are typically of the order of one year, which may be a serious constraint in a detector designed for continuous operation at a critical control point of a security system.

SUMMARY OF THE INVENTION

A specific construction of an embodiment taught by the present invention comprises a counter of unitary construction formed of a large sealed metal container, or box, with a coating of $^6$Li enriched metal on the interior. The lithium metal operates as the active material in the counter in that it absorbs neutrons incident on the box, producing energetic charged particle reaction products, which are detected by a multicelled proportional counter structure contained in the internal space defined by the box. The multicelled proportional counter structure is fabricated of a hydrogenous plastic. This material, in conjunction with additional hydrogenous moderator material placed adjacent to the box, scatters the incident neutrons back through the lithium metal and slows some of them to an energy at which they can be resonantly captured by the lithium, thereby providing for efficient detection of the neutrons. The proportional counter structure is filled with an inert gas as a counting medium. The counting gas is purified to sustain its purity.

Wires mounted within the box are spaced apart from each other and from the walls of the box and are electrically insulated from the walls of the box.

A high voltage source applies a high voltage to enable the metal box, the wires, and the counting gas to function in the proportional region to collect charge resulting from ionizing events in the counting gas, the wires being anodes and the metal box acting as a cathode. Each event result in an electrical pulse which may be detected and amplified by a preamplifier.

The dimensions of each cell of the multicellular structure and of the box are such that a reaction product from the $^6$Li(n,α)$^3$H reaction will stop with substantial probability in the counting gas. On the other hand, the energy deposition in the counting gas from a single electron or photon entering a cell will nearly always be small compared with the energy deposition resulting from the neutron capture reaction. As a result, the ionizing events occurring within the counting gas caused by the $^6$Li(n,α)$^3$H reaction may be discriminated from events caused lesser ionization.

A portal neutron monitor detector useable for inventory control of neutron source fissionable materials may be constructed utilizing an array of the large area proportional counters.

The entire array may be placed near or surrounded by moderating material to slow the neutrons. The counting gas may be circulated through the internal spaces of the counters in the array and then through a means for filtering and purifying the gas as it is circulated.

The monitor detector includes electronics for detecting and discriminating electrical pulses caused by the $^6$Li(n,α)$^3$H reactions from pulses arising from lesser ionizing events. The electronics may be used to activate an alarm means when the rate at which such pulses occur substantially exceeds a predetermined background.

The background may be determined by a microprocessor responsive to a photocell near the monitor detector. The photocell indicates the presence of a person or object in the monitor detector. When the photocell does not indicate such a presence, the microprocessor is in a disabled state in which it time averages the pulse rate. The time averaged pulse rate is the background. When the photocell indicates the presence of a person or object in the monitor, then the microprocessor is in an enabled state in which it compares the current pulse rate with the background rate.

Certain design features are important in attaining the objects of the invention. Among these are:

1. Low Background: The structural materials are chosen to be inherently free of naturally occurring radioactive contaminants. The thickness of the interior of the box and the composition of the counting gas are such that an ion resulting from neutron absorption in the $^6$Li coating will deposit a large fraction of its energy in the counting gas. The box is thin enough, however, that high energy electrons are unlikely to deposit a large fraction of their energy in the gas, thereby reducing the detection of background radiation due to gamma rays and other radiation.

2. Large Surface Area: The proportional counter structure is fabricated from materials which are both robust and resilient, thereby allowing very large structures to be fabricated without difficulty. The proportional counter wires are spring tensioned to prevent changes in the wire geometry due to temperature changes or mechanical distortion.

3. Low Sensitivity to Spurious Radiation: The proportional counter structure is enclosed in an electrically conductive box to minimize electrical noise interference. As already described, the thickness of the box is chosen to reduce the proportional counter sensitivity to high energy electrons. In addition, the interior of the box, containing counting gas, is subdivided into cells which are small enough to receive little energy deposit from high energy electrons or other long range particles. The boundaries of each cell are comprised of material in which such long range particles deposit most of their energy without causing substantial ionization in the counting gas. The remaining structural materials are of low atomic number which further reduces the gamma ray interaction probability.

4. Low Sensitivity to Mechanical Vibration: Motion of the proportional counter wires can produce noise interference due to the fact that the wires are at high potential and a finite capacitance to ground exists. Such noise is minimized by:
   a. Reducing the capacitance.
   b. Tensioning the wires.
   c. Providing periodic insulating support points along the length of the wire.

5. Stable Operation: The counter design minimizes instability effects arising from two principal sources as follows:
   a. Discontinuities in the wire support structure or surface leakage across insulators supporting the wires may cause spurious electrical discharges. In the present device both ends of the proportional counter wires are completely enclosed in insulating materials, thus preventing discharges which could exist in these regions. The interior of the box enclosure and the insulator through which the high voltage enters the box are kept very dry, thus eliminating surface leakage due to moisture. In addition, the entry insulator is fabricated with a guard ring which interrupts any leakage current and prevents noise from this source.
   b. Gas impurities may produce instability as a result of trapping electrons liberated by the charged reaction products in the gas, thereby gradually reducing the output signal. The impurities result from contaminants emitted by structural materials, and from erosion of interior surfaces by ions collected during operation. This source of instability is avoided by periodically replacing the detection gas or by circulating the gas through a purification system.

6. Low Cost: The design involves readily available low cost structural materials and employs low precision, low cost fabrication and assembly procedures.

7. High Efficiency: High neutron detection efficiency is achieved by employing an active material with a high neutron absorption cross section producing energetic reaction products. The thickness of the active material is chosen to be just thin enough to allow a large fraction of the charged particle reaction products to escape from the material. The interior components of the counter are constructed from a hydrogenous plastic which efficiently reduces the energy of the incident neutrons. In addition, a thick slab of hydrogenous moderator is placed outside and close to the containment box.

As a practical matter, the attainable size of the present specific construction is limited by the capabilities of presently available preamplifiers. As the size increases, so does the input capacitance. The inputs to presently available preamplifiers should not exceed 400-500 pf of input capacitance. Such capacitance would be reached in the presently envisioned specific construction with an area of about 16 ft.$^2$. However, better preamplifiers or other embodiments taught by the present invention may permit detectors of substantially larger area than 16 ft.$^2$.

It is accordingly an object of the present invention to provide a neutron counter having a large area for the detection of neutrons at an order of magnitude lower cost than can be achieved with present small detectors.

It is a further object of the present invention to provide a neutron counter having a lifetime substantially in excess of one year when used continuously in the presence of a neutron flux.

It is a further object of the present invention to provide a neutron counter suitable for use as a portal detector.

It is a still further object of the present invention to provide a neutron counter suitable for detecting plutonium in the assay of waste material.

Other objects and advantages of the present invention will become more apparent from the following description, particularly when taken in conjunction with the appended drawings, in which:

BRIEF DESCRIPTION OF THE DRAWINGS

FIG. 1 is a partially cut-away plan view of a specific construction of a large area neutron counter in accordance with the present invention;

FIG. 2 is a sectional side view of the counter shown in FIG. 1, taken along line 2—2 of FIG. 1;

FIG. 3 is an enlarged partial sectional end view of the counter shown in FIG. 1, taken along line 3—3 of FIG. 1;

FIG. 4A is a detail plan view of one of the strips of the dividing structure shown in FIG. 1;

FIG. 4B is a detail side view of one of the strips of the dividing structure shown in FIG. 1.

FIG. 5 is a detail view of the junction box shown in FIG. 1;

FIG. 6 is a schematic illustration of the electrical assembly supplying electrical power to the counter shown in FIG. 1;

FIG. 7 is a diagrammatic illustration of the gas assembly supplying counting gas to an array of counters, such as shown in FIG. 1, utilized in a portal neutron detector;

FIG. 8 is a schematic illustration of the preamplifier circuit used with the counter shown in FIG. 1;

FIG. 11 is a front elevation of a specific construction of a portal neutron detector utilizing the counters of FIG. 1 in accordance with the present invention; and FIG. 12 is a drawing showing the placement of one triad of the counters of FIG. 1 in the portal detector of FIG. 11.

DESCRIPTION OF THE PREFERRED EMBODIMENT

Figure 9:
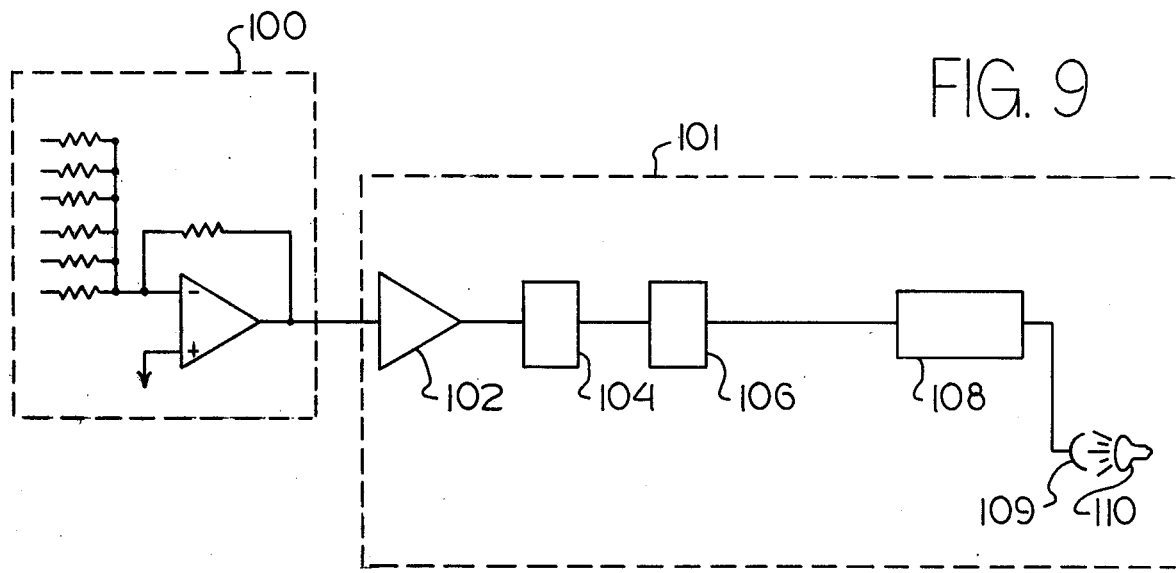
FIG. 9 is a schematic illustration of the electronic summing circuit used with an array of counters as shown in FIGS. 1 and 7.

As illustrated in FIGS. 1 and 2, a counter in the shape of a rectangular aluminum box 10 is fabricated by placing 0.03" thick and 2'×2' square aluminum sheets 12 on either side of the frame 14 fabricated from 0.5"×2" aluminum bar stock. The components are bonded with epoxy, which provides a seal to form a substantially leak-proof enclosure. The interior surfaces of the 0.03" aluminum sheets 12 are covered with 0.002" thick lithium metal foil 13 enriched to 95% $^6$Li. The foil 13 is applied in the form of 2" wide strips and bonded with a contact adhesive. The interior surfaces of the frame 14 may also be coated with lithium metal foil to provide additional surface for neutron capture.

A multicelled proportional counter structure is formed by placing a polyethylene assembly 16 inside the box described above, thereby providing a dividing structure. At one end of this assembly a first metal bus bar assembly 18 is contained within a polyethylene cover 20, as illustrated in FIGS. 2 and 3. The bus bar assembly 18 is constructed with metal dowels 22 spaced 1" apart. Each dowel supports a tensioning spring 24 to which, in turn, is attached a 0.002" diameter gold plated tungsten wire 26. Each wire 26 emerges from the polyethylene cover 20 through a slot 28, as illustrated in FIG. 2.

The wires 26 are routed in the midplane between the two lithium covered sheets 12. The other ends of the wires are anchored inside a second bus bar assembly 30. The tension on the wires is adjusted to be approximately one-third the breaking strength of the wire.

The two bus bar assemblies 18, 30 are joined via the polyethylene assembly 16, which comprises a rectangular grid formed from 0.25"×2" polyethylene strips, substantially as shown in FIG. 1. The grid divides the interior of the chamber into 6"×6"×2" cells. The wire pass through small holes 32 drilled in the strips which run perpendicular to the wires. The axes of the holes 32 are not precisely aligned with the centerlines of the wires. As a result, the edges of the holes make contact with the wires. The contact points are support points for the wires, thereby reducing electrical noise generated by changes in capacitance of the wires from mechanical vibration.

The grid reduces response to gamma rays by intercepting long range electrons resulting from Compton scattering events. The grid parts which are parallel to the wires are coated with aluminum foil 33, as illustrated in FIG. 4, which is in turn grounded to the interior of the box to prevent low field regions from forming near the grid due to charge buildup.

The bus bar assembly 18 and the attached wires 26 are biased to approximately +1800 volts via an insulated feed-through 34 in a junction box 36, as illustrated in FIGS. 1 and 5. The feed-through 34 incorporates a guard ring 38 to prevent noise due to surface leakage.

Referring to FIG. 6, it may be seen that the 1800 v. bias voltage is taken from an electrical assembly 39 comprising a high voltage power supply 40 through a 100 kilohm resistor 42 whose AC output is by-passed to ground 57 via a 4 $\mu$f capacitor 44, thereby providing an RC filter. The output of the filter is fed to the junction box 36 via 46 or 47. The power supply in a specific instruction is a Nim Bin available from Ortec, Inc., Oak Ridge, TN.

Referring to FIG. 5, it may be seen that a wire 48 with a spade lug 50 connects the source 40 to the detector bus bar 18 through a decoupling resistor 52, which has 5 megohm resistance in a specific construction. The wire 48 leads to an input of a preamplifier 54 via a coupling capacitor 56 which has a 1000 pf, 5000 v. rating in the specific construction described. The unused terminal 46 or 47 may be used to supply high voltage to additional detectors. A jack 60 in the junction box 36 provides means for supplying power to the preamplifier and taking output from the preamplifier 54.

A counting gas such as P10, which consists of 90% argon and 10% methane, may be introduced from a gas assembly 59, as shown in FIG. 7, through a convenient port 61, such as shown in FIG. 1, in the edge of the box 10 and taken out through a similar port in the same edge of the box. The gas may be at ambient atmospheric pressure. The gas assembly 59 includes a diaphragm pump 70 which circulates the gas in a closed loop as shown schematically in FIG. 7 for an array of 6 counters similar to the counter 10. The gas is passed through an activated charcoal filter 72 and a molecular sieve 74 before being returned to the box 10. A collapsible gas bag 76 with a capacity of approximately 15% of the box volume may be incorporated in the system to compensate for atmospheric pressure changes. Excess gas escapes through a mineral oil bubbler 78. The gas is supplied from a gas supply cylinder 80 through a regulator 82 and a needle valve 84 to fill the counters and closed loop. A flow gauge 86 in the closed loop monitors the gas flow.

The preamplifier circuit 54 in the specific construction comprises an op-amp 90 with a feedback loop to the inverting terminal containing a 30 pf capacitor 92 and a 100 megohm resistor 94 in parallel, as may be seen in FIG. 8. The noninverting terminal of the op-amp 90 is grounded, and the signal from capacitor 56 feeds the detector signal to the inverting terminal. A National Semiconductor LF351 op-amp is a convenient choice for the op-amp 90.

The proportional counter structure with counting gas, bias voltage, and preamplifier 54 is capable of operating as a large area proportional neutron counter. The counter may be used as part of an array of counters as indicated in FIG. 7. The outputs of all the preamplifiers 54 in the array are then summed in a summing amplifier 100, as indicated in FIG. 9.

The summed preamplifier signals in a specific construction are then fed to an electronic assembly 101 in which the signals are shaped with a commercially available bipolar amplifier 102 which may be an ORTEC 575 amplifier using 3 microsecond time constants. The output is fed to a discriminator 104 which is set above the maximum gamma ray pulse height. An ORTEC 550 discriminator may be used. The output of the discriminator 104 is in turn fed to a times 10 rate multiplier and line driver 106. The rate multiplier is shown in detail in FIG. 10. The output of line driver 106 is fed to a microprocessor controller 108, which monitors the average background, and signals an alarm when an averaged signal is detected which substantially exceeds the background. Another embodiment of the invention may dispense with the microprocessor and utilize other means to signal the alarm when the averaged signal substantially exceeds a predetermined background signal. A signal measurement is initiated by a photocell 109 when a light beam from a light source 110 near the detector is interrupted by the passage of a subject. Other means for activating the detector may also be used.

The microprocessor controller in a specific embodiment comprises an Intel MCS-80 microprocessor and may be used to monitor a plurality of detector arrays, each array at a different location.

Figure 10:
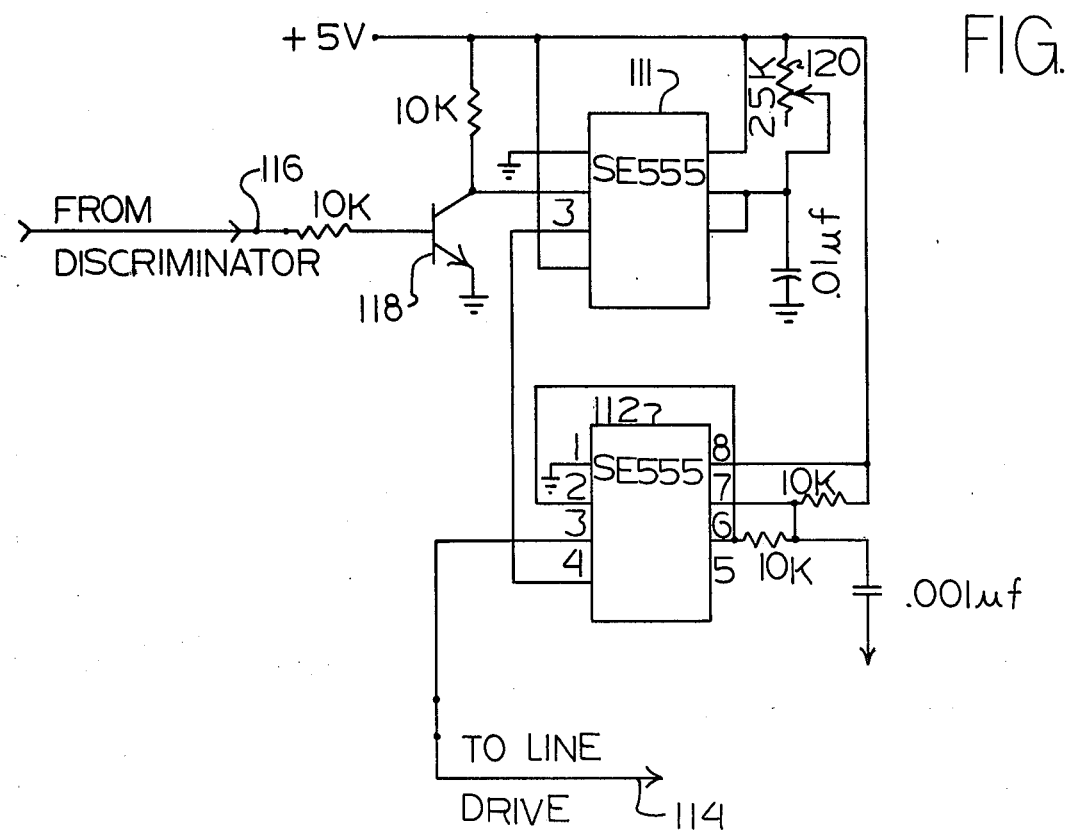
FIG. 10 is a circuit diagram of the pulse multiplier shown schematically in FIG. 9.

As shown in FIG. 10, the rate multiplier in the line driver 106 comprises a pair of precision timers 111, 112 such as Texas Instruments SE 555 devices cascaded to provide a train of pulses at an output 114 of the rate multiplier for each pulse at an input 116. The timer 111 is connected for monostable operation as shown, for example, in Texas Instruments, *The Linear Control Circuits Data Book*, (1976), p. 299. An input pulse on the base of a transistor 118 causes timer output 111-3 to output a timed pulse to the timer reset pin 112-4. The width of the timed pulse at output 111-3 varies according to the setting of a potentiometer 120 to a maximum of about 275 microseconds, assuming the input pulse width to be short compared with that time.

The timer 112 is connected for astable operation substantially as is shown on p. 300 of *The Linear Control Circuits Data Book*. Application of the timed pulse to terminal 112-4, which is the reset terminal, enables the timer 112 during the on time of the timed pulse. The timer 112, when enabled, emits a train of pulses on a pin 112-3, each about 7.2 microseconds long with a repetition time of about 13.7 microseconds. The potentiometer 120 may therefore be set to make the time pulse last for a time substantially equal to 137 microseconds. As a result, each pulse at the input 116 gives rise to 10 pulses at the output 114 which connects directly to the pin 112-3. This multiplication reduces roundoff errors due to the integer arithmatic used in the microprocessor.

A portal neutron monitor detector may be assembled utilizing an array of six counters having a common gas recirculation system in accordance with FIG. 7. The counters are surrounded by moderating material such as polyethylene slabs. In a specific construction illustrated in FIG. 11 the six counters 10 are placed between a pair of 34"×80"×2" such slabs 150 spaced approximately 36" apart. An approximately 2" thick slab 152 of polyethylene joins the two vertical slabs 150 at the top.

The six counters are arranged in triads on both sides of a space provided by the cover plate 152, and the side plates 150 as illustrated in FIGS. 11 and 12. The electric assembly 39, gas assembly 59, and electronic assembly 101 may be placed on top of the top polyethylene slab with suitable electrical leads 160 and plumbing 162 fed through the top slab.

In one test of the portal neutron monitor detector just described, there was a background of approximately 4 counts/second with no detectable gamma ray sensitivity. The detection efficiency for neutrons from $^{252}$Cf spontaneous fissions was approximately 1%. A 5 gram quantity of plutonium could be detected with substantially 100% probability when carried through the portal at normal walking speed.

The portal detector could be equipped with a gate to slow the transit speed of persons or vehicles passing through. It will, of course, be understood that modification of the present invention in its various aspects will be apparent to those skilled in the art, some being apparent only after study and others being a matter of routine design. For example, other moderating or supporting material may be used for construction of the grid formed by the polyethylene assembly 16 in the specific construction of an embodiment described herein. Other arrangements of counters and associated hardware with respect to each other and with respect to moderating material also fall within the scope of the present invention. The present invention also envisions variations in the method and equipment used to supply electrical power to the counter 10 and variations in the construction of the electronic assembly 101. Other sizes and shapes of counter and portal structures also fall within the teachings of the present invention. The scope of the invention, therefore, should not be limited by the particular embodiment and specific construction herein described, but should be defined only by the appended claims and equivalents thereof.

What is claimed is:

1. A large area unitary multicell neutron counter comprising:
    a container for defining an internal space and for confining counting gas therein, said container being formed of a pair of spaced substantially parallel metallic sheets sealed around their periphery and coated internally with a coating enriched with $^6$Li for capturing slow neutrons and emitting into said internal space reaction products thereupon produced by the $^6$Li(n,$\alpha$)$^3$H reaction;
    a plurality of wires mounted within said internal space, spaced apart from each other and said metallic sheets and substantially parallel to each other and between and substantially parallel to said metallic sheets and electrically insulated from said metallic sheets;
    a gas permeable dividing structure disposed within said internal space for dividing the internal space into discrete cells and absorbing electrons incident upon such structure, each cell having a width defined by the spacing between the coatings on said metallic sheets, with at least one wire passing through each cell;
    counting gas disposed within said container;
    electrical means for applying voltage to enable the said metallic sheets, wires, and counting gas to function at rated voltage in the proportional region in the collection of charged particles occasioned by ionizing events, the wires being anodes and the metallic sheets being cathodes, and the counting gas providing a medium in which the ionizing events occur; and
    discriminating means for discriminating ionizing events causing ionization above a discrimination level from ionizing events causing ionization below said discrimination level;
    the linear dimensions of each cell being so small that a reaction product from said $^6$L(n,$\alpha$)$^3$H reaction will with substantial probability stop in the counting gas whereas the energy deposition in the counting gas from a single electron resulting from a photon entering a cell will nearly always be small compared with the energy deposition from said reaction;
    whereby ionizing events occurring within the counting gas caused by the $^6$Li(n,$\alpha$)$^3$H reaction may be discriminated from events causing lesser ionization.

2. A portal neutron monitor detector for detection of neutron source fissionable materials carried by personnel passing through said detector, comprising:
    an array of large area unitary multicell neutron counters, each counter comprising:
    a container for defining an internal space and for confining counting gas therein, said container being formed of a pair of spaced substantially parallel metallic sheets sealed around their periphery and coated internally with a coating enriched with $^6$Li for capturing slow neutrons and emitting into said internal space reaction products thereupon produced by the $^6$Li(n,$\alpha$)$^3$H reaction,
    a plurality of wires mounted within said internal space, spaced apart from each other and said metallic sheets and substantially parallel to each other and between and substantially parallel to said metallic sheets and electrically insulated from said metallic sheets, and
    a gas permeable dividing structure disposed within said internal space for dividing the internal space into discrete cells and absorbing electrons incident upon such structure, each cell having a width defined by the spacing between the coatings on said metallic sheets, with at least one wire passing through each cell, and
    counting gas disposed within said container,
    the linear dimensions of each cell being so small that a reaction product from said $^6$Li(n,$\alpha$)$^3$H reaction will with substantial probability stop in the counting gas whereas the energy deposition in the counting gas from a single electron resulting from a photon entering a cell will nearly always be small compared with the energy deposition from said reaction,
    whereby ionizing events occurring within the counting gas caused by the $^6$Li(n,$\alpha$)$^3$H reaction may be discriminated from events causing lesser ionization;
    moderating means associated with said array for moderating neutrons from said neutron source materials so that a substantial fraction of such neutrons entering said array are slow;
    recirculation means for circulating counting gas through the internal spaces of all said containers;
    purifying means associated with said recirculation means for filtering and purifying said counting gas as the gas is circulated by said recirculation means;
    electrical means for applying voltage to enable the said metallic sheets, wires, and counting gas to function at rated voltage in the proportional region in the collection of charged particles occasioned by ionizing events to produce electrical pulses, the wires being anodes and the metallic sheets being cathodes, and the counting gas providing a medium in which the ionizing events occur;
    electronic means for discriminating electrical pulses within said array caused by ionizing events resulting from the $^6$Li(n,$\alpha$)$^3$H reactions occurring within said $^6$Li enriched coatings; and
    alarm means associated with said electronic means for indicating when the rate at which such pulses occur substantially exceeds a background rate.

3. A neutron counter according to claim 1 wherein said container is fabricated from a metal of low atomic number, thereby reducing the counter sensitivity to gamma rays.

4. A neutron counter according to claim 1 wherein said dividing structure is fabricated from a hydrogenous plastic.

5. A neutron counter according to claim 1 wherein said dividing structure comprises at least one longitudinal member extending substantially parallel to said wires and spaced therefrom for spanning the internal space to divide the space into cells on either side thereof and absorb electrons impinging thereon from either side, and at least one transverse insulating member extending transversely of said wires and intersecting them for spanning the internal space to divide the space into cells on either side thereof and absorb electrons impinging thereon from either side and providing insulating support intermediate the ends of each wire of said plurality of wires.

6. A neutron counter according to claim 1 wherein said metallic sheets are substantially rectangular in cross section and said wires are substantially parallel to an edge of said sheets.

7. A neutron counter according to claim 6 wherein said cells are all of substantially the same size and shape.

8. A neutron counter according to claim 1 wherein said dividing structure comprises a rectangular grid of hydrogenous plastic strips, some members of said grid being substantially perpendicular to said wires and some members of said grid being substantially parallel to said wires, the members substantially perpendicular having small holes through which respective said wires pass.

9. A neutron counter according to claim 8 wherein said small holes are misaligned with respect to such wires such that the edges of said holes provide support points for said wires.

10. A neutron counter according to claim 8 wherein said members substantially parallel to said wires are coated with metal foil electrically connected to said metallic sheets.

11. A neutron counter according to claim 1 wherein said container includes:
a first metal bus bar at an extremity of said internal space;
a second insulated bus bar at an opposing extremity of said internal space;
a plurality of spaced metal dowels fastened to each of the first and second bus bars; and
a plurality of tensioning springs, one spring connected to each metal dowel and said wires each connecting a tensioning spring connected to a dowel on said first metal bus bar to a dowel on said second bus bar;
said tensioning springs tensioning said wires at a substantial fraction of the breaking strength of the wires;
wherein said internal dividing structure joins said first metal bus bar and said second bus bar in spaced relation.

12. A neutron counter according to claim 11 wherein said first and second bus bars are separated from said internal dividing structure by first and second insulating covers, each said cover having a slot for passage of said wires.

13. A neutron counter according to claim 1 or any of claims 3 to 12 wherein said electrical means includes a high voltage supply, an insulated feed-through having a guard ring to prevent noise due to surface leakage, and a wire passing through said insulated feed-through and electrically connecting said high voltage supply to said plurality of wires.

14. A portal neutron monitor detector according to claim 2 wherein said recirculation means includes a collapsible gas bag for compensating atmospheric pressure changes.

15. A portal neutron monitor detector according to claim 2 wherein said purifying means includes an activated charcoal filter and a molecular sieve.

16. A portal neutron monitor detector according to claim 2 wherein said alarm means includes a microprocessor having a disabled state and an enabled state, and an alarm, whereby:
in the disabled state the microprocessor monitors said pulses to determine a background pulse rate; and
in the enabled state the microprocessor monitors said pulses to determine whether the pulse rate exceeds the last determined background rate and activates said alarm when said last determined background rate is substantially exceeded.

17. A portal neutron monitor detector according to claim 16 whereby said alarm means further includes activation means for putting said microprocessor in said enabled state when said portal monitor detector is occupied and for putting said microprocessor in said disabled state when said portal monitor detector is empty.

18. A portal neutron monitor detector according to claim 17 wherein said activation means comprises a light and a photocell.

19. A neutron monitor detector according to claim 2 comprising said array of large area unitary multicell neutron counters wherein said container is fabricated from a metal of low atomic number, thereby reducing the counter sensitivity to gamma rays.

20. A neutron monitor detector according to claim 2 comprising said array of large area unitary multicell neutron counters wherein said dividing structure is fabricated from a hydrogenous plastic.

21. A neutron monitor detector according to claim 2 wherein said dividing structure of each said counter comprises at least one longitudinal member extending substantially parallel to said wires and spaced therefrom for spanning the internal space to divide the space into cells on either side thereof and absorb electrons impinging thereon from either side, and at least one transverse insulating member extending transversely of said wires and intersecting them for spanning the internal space to divide the space into cells on either side thereof and absorb electrons impinging thereon from either side and providing insulating support intermediate the ends of each wire of said plurality of wires.

22. A neutron monitor detector according to claim 2 comprising said array of large area unitary multicell neutron counters wherein said metallic sheets are substantially rectangular in cross section and said wires are substantially parallel to an edge of said sheets.

23. A neutron monitor detector according to claim 2 comprising said array of large area unitary multicell neutron counters wherein said cells are all of substantially the same size and shape.

24. A neutron monitor detector according to claim 2 comprising said array of large area unitary multicell neutron counters wherein said dividing structure comprises a rectangular grid of hydrogenous plastic strips, some members of said grid being substantially perpendicular to said wires and some members of said grid being substantially parallel to said wires, the members substantially perpendicular to said wires having small holes through which respective said wires pass.

25. A neutron monitor detector according to claim 24 comprising said array of large area unitary multicell neutron counters wherein said small holes are misaligned with respect to such wires such that the edges of said holes provide support points for said wires.

26. A neutron monitor detector according to claim 24 comprising said array of large area unitary multicell neutron counters wherein said members substantially parallel to said wires are coated with metal foil electrically connected to said metallic sheets.

27. A neutron monitor detector according to claim 2 comprising said array of large area unitary multicell neutron counters wherein said container includes:
- a first metal bus bar at an extremity of said internal space;
- a second insulated bus bar at an opposing extremity of said internal space;
- a plurality of spaced metal dowels fastened to each of the first and second bus bars; and
  - a plurality of tensioning springs, one spring connected to each metal dowel and said wires each connecting a tensioning spring connected to a dowel on said first metal bus bar to a dowel on said second bus bar;
  - said tensioning springs tensioning said wires at a substantial fraction of the breaking strength of the wires;
  - wherein said internal dividing structure joins said first metal bus bar and said second bus bar in spaced relation.

28. A neutron monitor detector according to claim 2 comprising said array of large area unitary multicell neutron counters wherein said first and second bus bars are separated from said internal dividing structure by first and second insulating covers, each said cover having a slot for passage of said wires.

29. A neutron monitor detector according to claim 2 or any of claims 19 to 28 wherein said electrical means includes a high voltage supply, an insulated feed-through having a guard ring to prevent noise due to surface leakage, and a bus wire passing through said insulated feed-through and electrically connecting said high voltage supply to said plurality of wires.

* * * * *